United States Patent [19]
Bernin
[11] 3,851,319
[45] Nov. 26, 1974

[54] DIAGNOSTIC SOLID STATE SWITCH STRUCTURE

[75] Inventor: Victor M. Bernin, Mount Prospect, Ill.
[73] Assignee: Illinois Tool Works Inc., Chicago, Ill.

[22] Filed: Mar. 26, 1973
[21] Appl. No.: 345,210

[52] U.S. Cl. .......... 340/174 SP, 340/174 PM
[51] Int. Cl. .......... G11c 17/00
[58] Field of Search .......... 340/174 PM, 174 SP; 197/98; 336/110

[56] References Cited

UNITED STATES PATENTS

| | | | |
|---|---|---|---|
| 2,781,503 | 2/1957 | Saunders | 340/174 PM |
| 3,199,089 | 8/1965 | Astrove et al. | 340/174 PM |
| 3,407,396 | 10/1968 | Lukianov | 340/174 PM |
| 3,451,047 | 6/1969 | Gutwin | 340/174 PM |
| 3,521,248 | 7/1970 | Visschedijk | 340/174 PM |
| 3,646,531 | 2/1972 | Marahashi | 340/174 PM |

*Primary Examiner*—Stanley M. Urynowicz, Jr.
*Attorney, Agent, or Firm*—Olson, Trexler, Wolters, Bushnell & Fosse, Ltd.

[57] ABSTRACT

The embodiment of the invention disclosed herein is directed to a diagnostic solid state switch structure capable of sensing the relative operable condition of the switch while in use. The switch structure includes a closed loop magnetic core member capable of being magnetically saturated and unsaturated in response to the presence and absence, respectively, of a magnetic field. Drive and sense lines pass through the core structure and provide transformer coupling of signals transmitted along the drive line to be picked-up by the sense line when the core member is in a magnetically unsaturated state. Means are provided to magnetically saturate the closed loop magnetic core member with a magnetic flux path in one direction during operative use and for magnetically saturating the core member in another direction for testing. Bi-directional pulse signal information is delivered to the switch, one of the pulses being in magnetic aiding with the flux path to have no effect while the other of the pulses being in magnetic subtracting with the flux path thereby providing a sensed output to give an indication of the relative operability of the switch.

1 Claim, 6 Drawing Figures

DIAGNOSTIC SOLID STATE SWITCH STRUCTURE

BACKGROUND OF THE INVENTION

This invention relates generally to switch structures, and more particularly to solid state switch structures of the type having closed loop magnetic core members capable of being magnetically saturated and unsaturated as a result of the presence and absence of magnetic fields.

In the operation of electronic components it is often times necessary to test specific operability of components during the life of the equipment in which the components are installed. This includes testing of switches connected in electronic circuits, particularly computer circuits or space and aircraft vehicles where operability of such components can be critical. To test such components it is often necessary to shutdown the circuit, and/or remove the component from the circuit to establish its effective operability under dynamic conditions in a piece of test equipment.

SUMMARY OF THE INVENTION

Accordingly, it is an object of this invention to provide a solid state switch construction which can be tested while still in an operative condition in a circuit.

Briefly, the purpose of the solid state switch device of this invention is to function as a diagnostic switch structure that is capable of being tested while in use, and in any selected position, as to whether or not it is a good or bad switch. A typical application of this type of switch would be in a device or system in which the diagnostic function has been incorporated in which it is necessary to functionally check-out the system including switches, while the equipment is in operation.

The solid state diagnostic switch of this invention consists of a ferrite core formed as a closed loop magnetic core member and a permanent magnet for saturating the core. The design of the magnet is such that in one position the magnet will saturate the core with the saturating flux passing therethrough in one given direction. The second position of the magnet will saturate the core with the saturating flux in this instance passing through the core in the opposite direction.

Drive and sense lines pass through the closed loop magnetic core and provide means for transformer coupling of signals therebetween when the core is in a magnetically unsaturated condition. The drive signal along the drive line is a bipolar pulse signal having both positive and negative pulse characteristics. With the magnet in one position the closed loop magnetic core will be saturated, and the direction of the saturation will depend on the position of the switch. Therefore, only one polarity of the pulses applied to the drive line will appear at the output of the sense line since one polarity of the pulse will further saturate the core, providing no output, and the other polarity of pulse will substantially unsaturate the core to provide the pulse output. The positive and negative signals can be used as required by a given circuit, such as a flip-flop or the like to effect circuit condition switching. A pulse signal will always be present on the sense line, and this fact, therefore, can be used to determine if the switch is or is not in a functioning condition. In addition, if the magnet becomes defective for any reason, both polarity of pulses will be present simultaneously giving an indication of a defective magnet and this will effect a circuit indication of a defective switch.

Hysteresis to effect positive switching action of the switch over a given range of movement can be provided by incorporating a mechanical snap action device into the actuator associated with the magnet or by means of a hysteresis circuit as disclosed herein.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
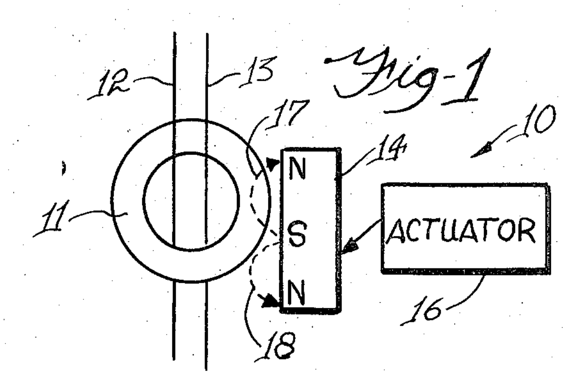
FIG. 1 is a diagrammatic representation of a diagnostic switch constructed in accordance with the principles of this invention showing the permanent magnet thereof in one position.
Figure 2:
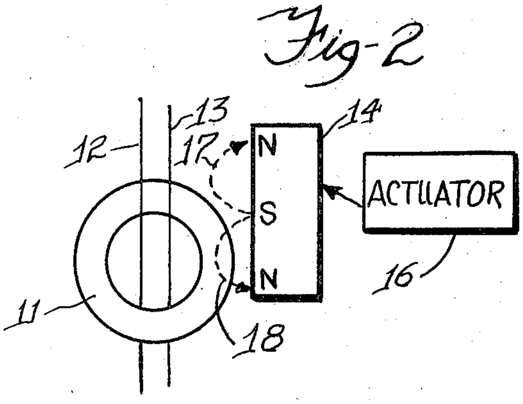
FIG. 2 is a diagrammatic representation of the switch of FIG. 1 showing the permanent magnet in a second position.

Referring now to FIGS. 1 and 2 there is seen a solid state switch constructed in accordance with the principles of this invention and designated generally by reference numeral 10. The solid state switch construction 10 is a diagnostic solid state switch in that it provides automatic testing of its operation while still in the circuit. The switch 10 includes a closed loop magnetic core member 11, preferable toroidal in configuration, and made of ferrite material such as ceramic magnetic materials. Passing through the closed loop magnetic core member 11 is a drive line 12 arranged for connection to a source of signal information of bipolar characteristics. Also, passing through the closed loop magnetic core member 11 is a sense line 13 associated with the drive line 12 for transformer coupling therefrom, signal information along the drive line when the closed loop magnetic core member is in a magentically unsaturated condition, or when the closed loop magnetic core member is driven to an unsaturated condition as a result of one of the pulse signals along the drive line 12. Positioned adjacent the core member 11 is a movable permanent magnet 14 actuated by actuator means designated generally by reference numeral 16. The actuator 16 may include suitable snap action means for insuring positive movement of the magnet between its two or more desired positions along its travel.

The magnet 14 is a permanent magnet having one magnetic pole substantially centrally of the magnet while having the ends thereof of opposite magnetic poles with respect to the central portion but of similar magnetic poles with respect to the ends. In the illustrated embodiment the central portion is designated south pole while the end portions are designated north poles. This causes a magnetic flux path 17 to pass from the south pole to one of the north poles in one direction while a second magnetic flux path 18 passes from the south pole to the north pole in the opposite direction. Therefore, the direction of magnetic flux path through the closed loop magnetic core member 11 can be changed by moving the permanent magnet 14. This is best illustrated in FIGS. 1 and 2 which show the two relative positions. For example, in FIG. 1 the closed loop magnetic core member is saturated by the flux path 17 when the magnet 14 is in the lower position, as seen in the drawings. In FIG. 2, however, closed loop magnetic core member 11 is saturated by flux path 18, it being noted that this flux path is in the opposite direction, when the magnet 14 is in the raised position, as seen in the drawings.

Figures 3, 4, 5, 6:
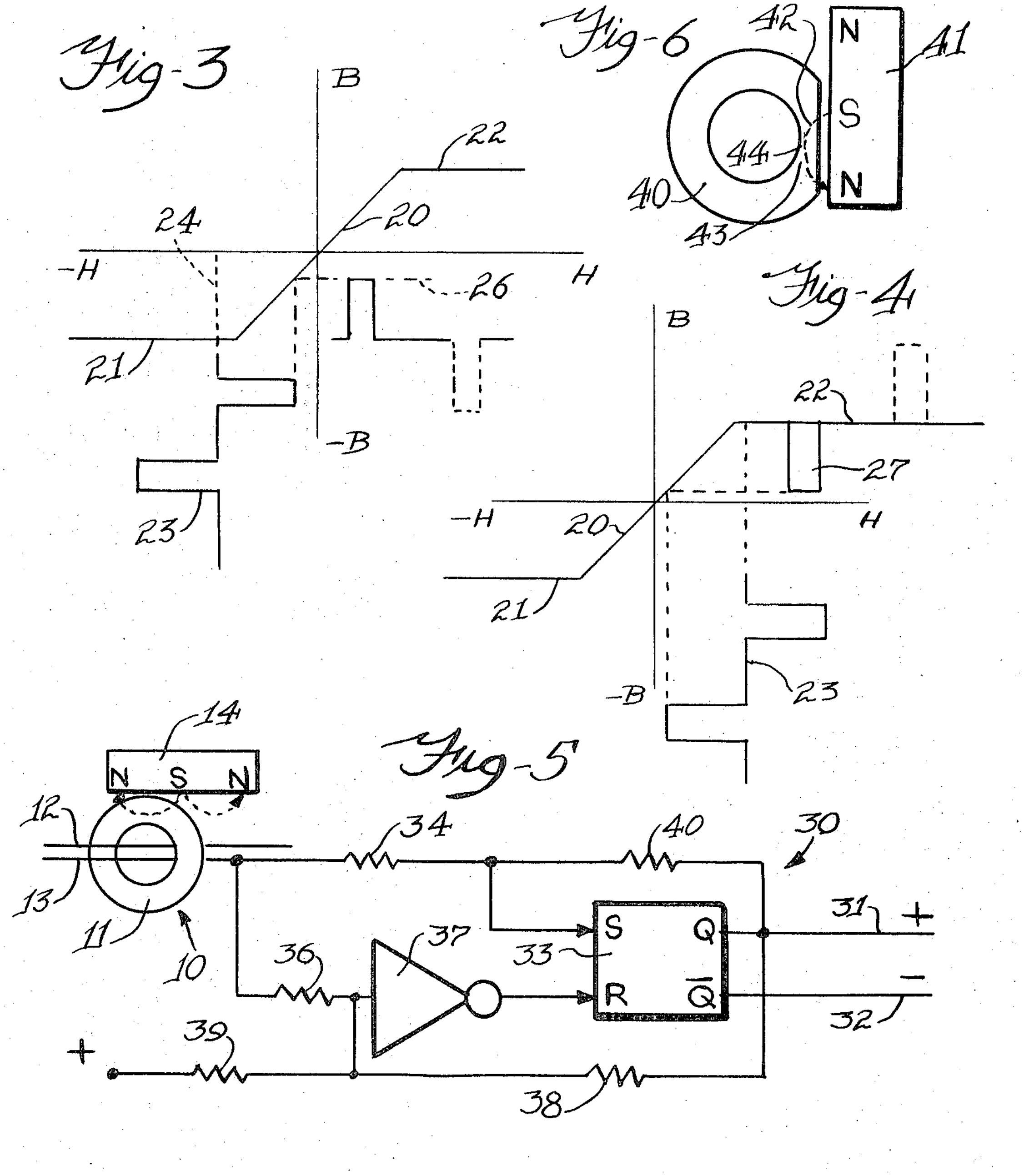
FIG. 3 is a chart showing signal coupling through the switch when the magnet is in one position.
FIG. 4 illustrates signal coupling of the switch when the magnet is in a second position.
FIG. 5 illustrates one form of electronic circuit used to effect hysteresis characteristic of the switch.
FIG. 6 illustrates a modified form of closed loop magnetic core configuration used in this invention.

FIG. 3 illustrates the magnetic hysteresis HB curve, designated generally by reference numeral 20, with its minimum and maximum values 21 and 22 illustrating magnetic saturation of the closed loop magnetic core member 11. A bipolar train of pulses 23 is indicated along a bias flux line designated by reference numeral 24 and is transformer coupled along transfer line 26 into the sense line 13, FIG. 1, when the core member 11 is saturated with the flux path 17. This arrangement will cause only positive pulses to be sensed in the sense line 13 since negative pulses will drive the saturation of the core to a further saturated condition which has no effect on the output of the sense line.

Movement of the magnet 14, to the position shown in FIG. 2, will cause the train of bipolar pulses 23 to be shifted to the upper portion of the slope of curve 20, seen in FIG. 4. This will result in producing only negative output signals 27 while positive output signals are eliminated as a result of further saturation of the core. By so providing continuous output signals of a predetermined polarity the condition of the switch formed by the core 11 and magnet 14 is at all times known.

Referring now to FIG. 5 there is seen a hysteresis circuit designated generally by reference numeral 30 to which the switch structure 10 is connected. The hysteresis circuit 30 provides electronic means for effecting positive snap action of transformer coupled output signals to a utilization circuit connected to output terminals 31 and 32. Here the sense line 13 is connected to the S-input of a flip-flop circuit 33 through a series connected resistor 34. The sense line 13 is also connected to an R-input of the flip-flop 33 through a resistor 36 and an invertor circuit 37. Therefore, the polarity of signal applied to the reset input is opposite that of the polarity applied to the set input. The output of the flip-flop circuit 33, as connected to terminal 31, is delivered back to the set and reset inputs via feedback resistors 40 and 38, respectively. Operating potential is applied to the circuit through a bias resistor 39.

In operation, analog output signals from the switch 10, i.e., signals varying in amplitude corresponding to decreases in the magnitude of magnetic saturation, will effect a switching action at the output terminals 31 and 32 only when a minimum predetermined threshold level is reached. This will then set the flip-flop 33 to a switched condition to indicate that a switching action has occurred in the solid state switch 10. By so providing a hysteresis circuit of this type mechanical snap action devices are eliminated.

FIG. 6 illustrates a modified configuration of the closed loop magnetic core member and is designated generally by reference numeral 40 positioned adjacent a movable permanent magnet 41. The flux path, indicated by reference numeral 42, of the magnet 41 passes through the somewhat reduced cross section area 43 in the region of a flat-sided portion 44. This provides a concentration of magnetic flux in the closed loop magnetic core member to more readily saturate the core member in response to the magnetic field. It will be understood that still further configurations of core members can be used to achieve the same results.

While several embodiments of the solid state switch and a single embodiment of a hysteresis circuit are shown it will be understood that variations and modifications to these aspects of the invention can be made without departing from the spirit and scope of the novel concepts disclosed and claimed herein.

The invention is claimed as follows:

1. In a switching system including at least one closed loop magnetic core, a drive winding passing through said core for receiving bipolar signals, a sense winding passing through said core in such a manner that electrical signals of a given polarity will be inductively coupled from said drive winding to said sense winding only when said core is magnetically unsaturated for signals of said given polarity and a selectively positionable magnetic field-producing magnetic means capable of saturating said core, a diagnostic means comprising control means for selectively controlling the coupling of the magnetic field of said magnetic means so that saturating magnetic flux through said core is selectively provided in a first direction, and in a second direction which is opposite to said first direction, so that electrical signals of opposite polarity are selectively coupled between said drive and sense windings, bistable means having a set input terminal and a reset input terminal constructed so as to switch to its set state from its reset state when a signal of a given polarity is supplied to said set input terminal or to its reset state from its set state when a signal of said given polarity is supplied to said reset terminal and signal inversion means having an input terminal coupled to said sense line and an inverted signal output terminal coupled so as to supply an inverted signal from said sense line to said reset input terminal, said set input terminal of said bistable means being coupled to said sense line so as to receive an uninverted signal from said sense line.

* * * * *